(12) United States Patent
Gumpoltsberger

(10) Patent No.: US 7,186,204 B2
(45) Date of Patent: Mar. 6, 2007

(54) MULTI-STEP TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 179 days.

(21) Appl. No.: 10/520,139

(22) PCT Filed: Jul. 7, 2003

(86) PCT No.: PCT/EP03/07242

§ 371 (c)(1),
(2), (4) Date: Jan. 3, 2005

(87) PCT Pub. No.: WO2004/007998

PCT Pub. Date: Jan. 22, 2004

(65) Prior Publication Data

US 2005/0119089 A1    Jun. 2, 2005

(30) Foreign Application Priority Data

Jul. 11, 2002 (DE) ................................ 102 31 349

(51) Int. Cl.
*F16H 3/66* (2006.01)
(52) U.S. Cl. ........................ 475/323; 475/275
(58) Field of Classification Search ............... 475/423, 475/323, 275, 326, 284, 286, 296
See application file for complete search history.

(56) References Cited

U.S. PATENT DOCUMENTS

| 4,683,776 | A | 8/1987 | Klemen |
| 5,106,352 | A | 4/1992 | Lepelletier |
| 6,053,839 | A | 4/2000 | Baldwin et al. |
| 6,139,463 | A | 10/2000 | Kasuya et al. |
| 6,217,474 | B1 | 4/2001 | Ross et al. |
| 6,572,507 | B1 | 6/2003 | Korkmaz et al. |
| 6,634,980 | B1 | 10/2003 | Ziemer |
| 6,669,597 | B1 * | 12/2003 | Usoro et al. ................. 475/323 |
| 7,018,319 | B2 * | 3/2006 | Ziemer ........................ 475/296 |
| 2003/0083174 | A1 * | 5/2003 | Tabata et al. ............... 475/323 |

FOREIGN PATENT DOCUMENTS

| DE | 1 505 723 | 7/1970 |
| DE | 199 12 480 A1 | 9/2000 |
| DE | 199 49 507 A1 | 4/2001 |
| DE | 100 43 751 A1 | 6/2001 |
| EP | 0 434 525 A1 | 6/1991 |
| JP | 02154840 A | 6/1990 |

* cited by examiner

*Primary Examiner*—Sherry Estremsky
*Assistant Examiner*—Edwin A. Young
(74) *Attorney, Agent, or Firm*—Davis Bujold & Daniels, P.L.L.C.

(57) ABSTRACT

A multi-step transmission comprising an input shaft and an output shaft, three spider supported planetary gear sets, seven rotational shafts, six shifting elements, whose selective engagement realizes seven forward gears and one reverse gear, whereby the input takes place through a shaft, connected with an element of the first planetary gear set; a further element of the first planetary gear set connected to the housing through a shaft; the output takes place through a shaft, connected with the planet carrier of the second planetary gear set and the ring gear of the third planetary gear set; a shaft is connected with the planet carrier of the third planetary gear set; a shaft is connected with the ring gear of the second planetary gear set; a shaft is connected with the ring gear of the first planetary gear set.

23 Claims, 4 Drawing Sheets

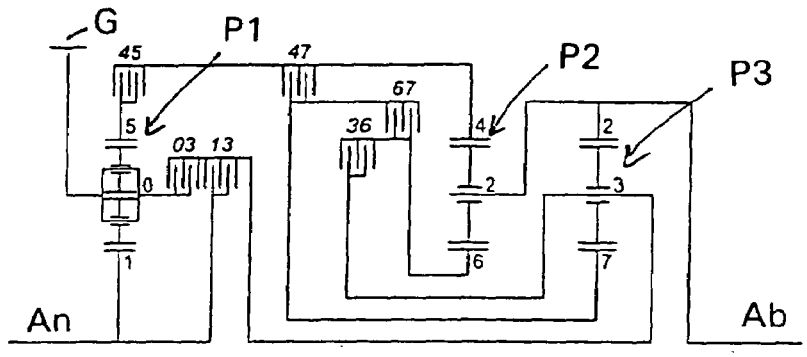
Fig. 1
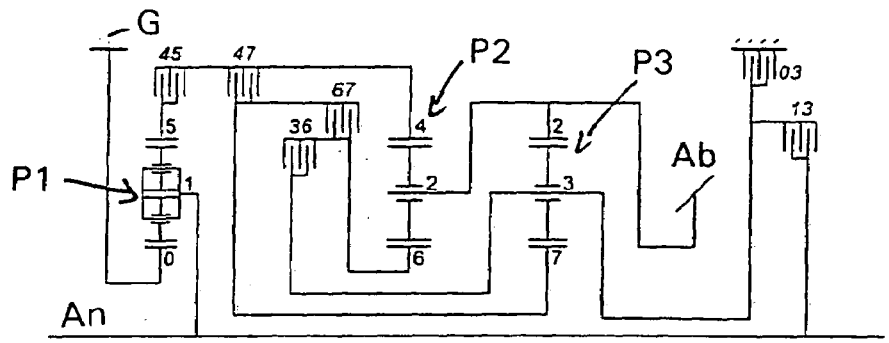
Fig. 2
| Gear: | 03 | 13 | 36 | 45 | 47 | 67 | i | φ |
|---|---|---|---|---|---|---|---|---|
| 1 | ● | | | ● | | ● | 5.90 | 1.67 |
| 2 | ● | | ● | ● | | | 3.52 | 1.45 |
| 3 | | | ● | ● | ● | | 2.42 | 1.44 |
| 4 | | ● | ● | ● | | | 1.68 | 1.27 |
| 5 | | ● | | ● | | ● | 1.32 | 1.32 |
| 6 | | ● | | | ● | ● | 1.00 | 1.27 |
| 7 | | ● | | ● | ● | | 0.79 | 0.89 |
| R | ● | | | ● | ● | | -5.24 | 7.50 |
Fig. 3

MULTI-STEP TRANSMISSION

This application is a national stage completion of PCT/EP2003/007242 filed Jul. 7, 2003 which claims priority from German Application Serial No. 102 31 349.0 filed Jul. 11, 2002.

FIELD OF THE INVENTION

The present invention relates to a multi-step transmission in planetary construction, especially an automatic transmission for a motor vehicle.

BACKGROUND OF THE INVENTION

Automatic transmissions, especially for motor vehicles, include planetary gear sets according to the state of the art, which are shifted using friction or shifting elements such as couplings and brakes; are usually connected with a starting element subject to a slip effect and are optionally provided with a bypass clutch, such as a hydrodynamic torque converter or a hydraulic coupling.

A transmission of this type is revealed in EP 0 434 525 A1. It basically includes an input shaft and an output shaft, which are arranged parallel to each other, double planetary gear sets arranged concentrically in relation to the output shaft and five shifting elements in the form of three clutches and two brakes, whose selective locking respectively determines in pairs the different gear reductions between the input shaft and the output shaft. Hereby, the transmission has a front-mounted gear set and two power paths so that six forward gears can be attained through the selective engagement in pairs of the five shifting elements.

Two clutches are needed, in connection with the first power path to transmit the torque from the front-mounted gear set to two elements of the double planetary gear set. These are basically arranged behind the front-mounted gear set in the direction of the double planetary gear set in the direction of the power flow. A further clutch is provided, in connection with the second power path, which detachably connects this with a further element of the double planetary gear set. The clutches are arranged in such a way that the internal disk support forms the output.

Furthermore, a compact multi-step transmission in planetary construction, especially for a motor vehicle, is known from the publication U.S. Pat. No. 6,139,463, which has two planetary gear sets and one front-mounted gear set, as well as three clutches and two brakes. Two clutches C-1 and C-3 are provided with this known multi-step transmission in connection with a first power path for transmitting the torque from the front-mounted gear set to the two planetary gear sets. The external disk support or the cylinder or the piston or the pressure compensation side of clutch C-3, is connected with a first brake B-1. Moreover, the internal disk support of the third clutch C-3 is connected with the cylinder, or piston or pressure compensation side of the first clutch C-1, whereby the internal disk support of the first clutch C-1 is arranged on the output side, and is connected with a sun wheel of the third planetary gear set.

Additionally, a multi-step transmission is known from DE 199 49 507 A1 of the Applicant, in which two non-shiftable, front-mounted gear sets are provided on the input shaft, which generate two speeds on the output side that can, in addition to the speed of the input shaft, be shifted selectively to shiftable double planetary gear sets acting on the output shaft through the selective closing of the shifting elements in such a way, that in each case only one shifting element of the two shifting elements just activated must be engaged or disengaged for shifting from one gear into the respectively next following higher or lower gear.

Furthermore, an automatically shiftable, motor vehicle transmission with three spider supported planetary gear sets, as well as three brakes and two clutches for shifting six forward gears and one reverse gear, and with an input shaft, as well as an output shaft, is known from DE 199 12 480 A1. The automatically shiftable motor vehicle transmission is constructed in such a way that the input shaft is directly connected with the sun wheel of the second planetary gear set, and that the input shaft can be connected with the sun wheel of the first planetary gears through the first clutch, and/or through the second clutch with the planet carrier of the first planetary gear set. In addition or as an alternative, the sun wheel of the first planetary gear set can be connected through the first brake with the housing of the transmission and/or the planet carrier of the first planetary gear set through the second brake with the housing and/or the sun wheel of the third planetary gear set through the third brake with the housing.

The present invention is based upon the objective of proposing a multi-step transmission of the type stated above, in which the construction effort is optimized and, moreover, the degree of efficiency in the main driving gears is improved with respect to drag and gearing losses. Additionally, low torques are supposed to act on the shifting elements and planetary gear sets in the multi-step transmission of the invention, and the speeds of the shafts, shifting elements, and planetary gear sets are supposed to be kept as low as possible. Furthermore, the number of gears, as well as the transmission ratio spread are supposed to be increased.

SUMMARY OF THE INVENTION

A multi-step transmission in planetary construction is proposed, according to the invention, which has an input shaft and an output shaft that are arranged in a housing. Furthermore, at least three spider supported planetary gear sets, at least seven rotational shafts and at least six shifting elements, including brakes and clutches, are provided, whose selective engagement effects various reductions between the input shaft and the output shaft so that preferably seven forward gears and one reverse gear can be realized.

In accordance with the present invention, in connection with the multi-step transmission, it is provided that the drive takes place through a shaft, which is continuously connected with an element of the first planetary gear set, whereby a further element of the first planetary gear set is continuously connected with the housing; that the output is effected through a shaft, which is connected with the planet carrier of the second planetary gear set and the ring gear of the third planetary gear set. Furthermore, with the multi-step transmission of the invention, it is provided that a further shaft is continuously connected with the planet carrier of the third planetary gear set; that a further shaft is continuously connected with the ring gear of the second planetary gear set, and a further shaft is continuously connected with the ring gear of the first planetary gear set; that a further shaft is continuously connected with the sun wheel of the second planetary gear set, and that a further shaft is continuously connected with the sun wheel of the third planetary gear set, whereby the planetary gear sets are coupled with shafts and shifting elements. Hereby, the input shaft of the invention can either be connected with the planet carrier or with the sun wheel of the first planetary gear set, whereby the fixed connection of the first planetary gear set to the housing is achieved via the sun wheel or the planet carrier of the first planetary gear set.

According to the invention, the second planetary gear set and the third planetary gear set are realized as minus planetary gears; the first planetary gear set is a plus planetary gear set.

Suitable reductions, as well as a considerable increase of the overall ratio spread of the multi-step transmission, are the result of the configuration of the multi-step transmission in accordance with the invention, owing to which an improvement in driving comfort and a significant reduction in fuel consumption are brought about.

The multi-step transmission of the invention is suitable for any motor vehicle, especially for passenger cars and for commercial motor vehicles, such as trucks, buses, construction vehicles, rail vehicles, caterpillar vehicles and the like.

In addition, the construction expenditure is considerably reduced with the multi-step transmission of the invention through a low number of shifting elements, preferably four clutches and two brakes. With the multi-step transmission of the invention, it is advantageously possible to conduct a starting operation with a hydrodynamic converter, an external starting clutch or also with other suitable external starting elements. It is also conceivable to enable a starting procedure with a starting element incorporated into the transmission. Preferably a shifting element, which is activated in first gear and in the reverse gears, is suitable.

In addition, a good degree of efficiency in the main driving gears is achieved with the multi-step transmission of the invention with respect to drag and gearing losses.

Moreover, low torque is present in the shifting elements and the planetary gear sets of the multi-step transmission, due to the wear and tear on the multi-step transmission, is advantageously reduced. Furthermore, correspondingly small dimensions are made possible due to the low torque, due to the required space and the corresponding costs can be reduced. In addition, low speeds are also present on the shafts, shifting elements and planetary gear sets.

Therefore, the transmission of the invention is designed in such a way that adaptability to different power train configurations in the direction of the power flow, as well as with respect to space, is made possible.

BRIEF DESCRIPTION OF THE DRAWINGS

The invention will now be described, by way of example, with reference to the accompanying drawings in which:

FIG. 1 represents a schematic view of a preferred embodiment of a multi-step transmission of the invention;

FIG. 2 represents a schematic view of an additional preferred embodiment of a multi-step transmission of the invention;

FIG. 3 represents a shifting diagram for the multi-step transmission of the invention in accordance with FIG. 1 and FIG. 2;

DETAILED DESCRIPTION OF THE INVENTION

Figure 4:
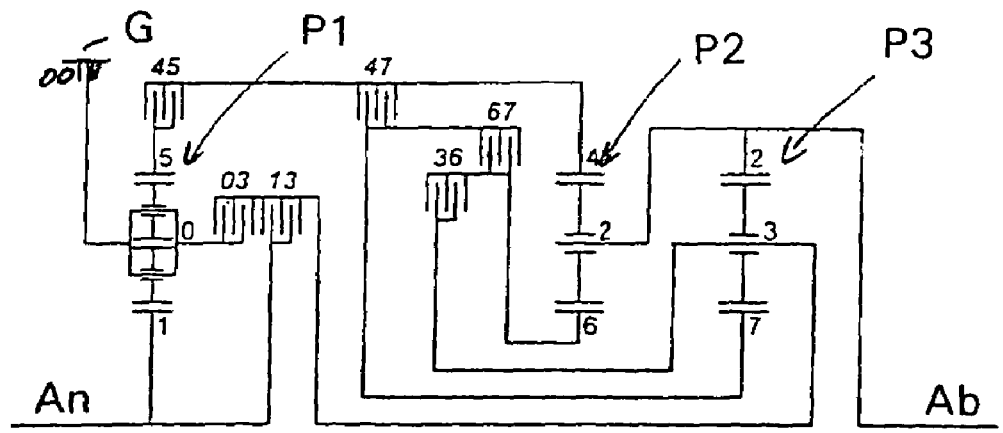
FIG. 4 represents a schematic view of a further preferred embodiment of a multi-step transmission of the invention.

FIGS. 1 and 2 show a multi-step transmission of the invention with an input shaft 1 (An) and an output shaft 2 (Ab), which are arranged in a housing G. Three spider supported planetary gear sets P1, P2, P3 are provided. The second planetary gear set P2 and the third planetary gear set P3 are constructed as minus planetary gear sets. The first planetary gear set P1 is constructed as a plus planetary gear set in accordance with the invention.

As apparent from FIGS. 1 and 2, only six shifting elements, namely a brake 03, and five clutches 13, 36, 45, 47 and 67 are provided.

Selective shifting of seven forward gears and a reverse gear can be realized with the shifting elements. The multi-step transmission of the invention has a total of seven rotational shafts in accordance with FIG. 1, namely shafts 1, 2, 3, 4, 5, 6, and 7.

In accordance with the invention, it is provided with the multi-step transmission, according to FIG. 1, that the drive takes place through shaft 1, which is continuously connected with the sun wheel of the first planetary gear set P1, whereby the planet carrier of the first planetary gear set P1 is continuously connected with the housing G. The output takes place through shaft 2, which is connected with the planet carrier of the second planetary gear set P2, and the ring gear of the third planetary gear set P3. Furthermore, shaft 3 is continuously connected with the planet carrier of the third planetary gear set, and shaft 4 is continuously connected with the ring gear of the second planetary gear set P2. In addition, shaft 5 is continuously connected with the ring gear of the first planetary gear set P1. According to the invention, the additional rotational shaft 6 is continuously connected with the sun wheel of the second planetary gear set P2, whereby shaft 7 is continuously connected with the sun wheel of the third planetary gear set P3.

With the multi-step transmission of the invention, shaft 3 can be coupled onto the housing G through the brake 03. The clutch 13 connects shaft 1 and shaft 3 detachably with one another. Shaft 3 and shaft 6 are detachably connected with each other through clutch 36. Furthermore, clutch 45 detachably connects shafts 4 and 5; clutch 47 detachably connects shafts 4 and 7 with each other, whereby a further clutch 67 is provided, which detachably connects shaft 6 and shaft 7.

A further embodiment of the multi-step transmission of the invention is shown in FIG. 2. The only difference, as compared to the embodiment according to FIG. 1, consists in that shaft 1 is connected with the planet carrier of the first planetary gear set P1, and that the sun wheel of the first planetary gear set P1 is continuously connected with the housing G.

A shifting diagram of the multi-step transmission of the invention, in accordance with FIGS. 1 and 2, is represented in FIG. 3. A respective reduction i of the individual gear stages and the stage progressions φ to be determined on their basis can be inferred by way of example. Furthermore, it can be inferred from the shifting diagram that double shifts can be avoided with sequential modes of shifting, since two adjacent gear steps respectively use two shifting elements in common.

The brake 03 and the clutches 45 and 67 are activated for the first gear. The second gear results from brake 03 and the clutches 36 and 45, and the third gear from clutches 36, 45, and 47. In the fourth gear, clutches 13, 36, and 45 are activated. According to the FIG. 3, the fifth gear results from the closing of the clutches 13, 45, and 67; the sixth gear requires the combination of the clutches 13, 47, and 67. For the seventh gear, clutches 13, 45, and 47 are required, whereas the reverse gear results from the closing of the brake 03 and clutches 45, and 47.

Figure 5:
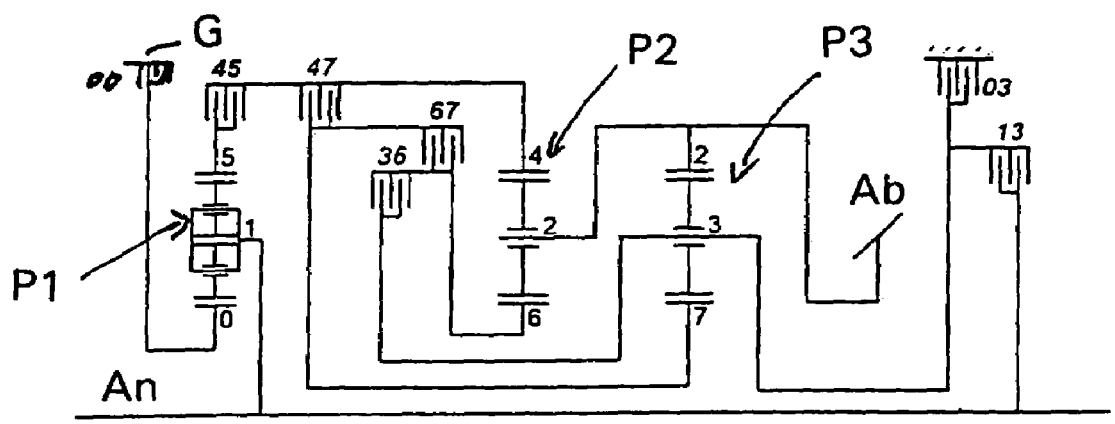
FIG. 5 represents a schematic view of a further preferred embodiment of a multi-step transmission of the invention.

According to FIGS. 1 and 2, the fixed connection of the ring gear of the first planetary gear set P1 to the housing G can be replaced by a detachable connection, preferably by means of a brake. This is shown in FIGS. 4 and 5, by way of example, which correspond to the embodiments according to FIG. 1 and/or FIG. 2, with the difference that the connection of the planet carrier of the first planetary gear set P1 with the housing G is detachably realized by means of a brake 00.

Figure 13:
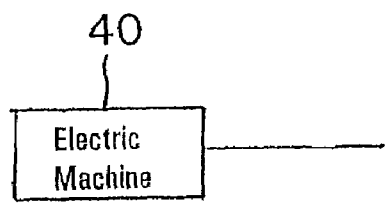
FIG. 13 is a diagrammatic view of the multi-step transmission with an electric machine.

Hereby, an electric machine 40 or an additional suited drive source may be arranged on the shaft 0, which was detached by means of the brake 00 (this is diagrammatically shown in FIG. 13).

Figure 12:
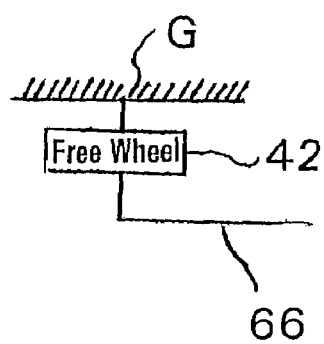
FIG. 12 is a diagrammatic view of the multi-step transmission having a free wheel.

It is possible, in accordance with the invention, as shown in FIG. 12. to provide a free wheel(s) 42 at each suitable position of the multi-step transmission, for example, to be connected between a shaft 66 and the housing G or about two shafts, if need be.

Figure 6:
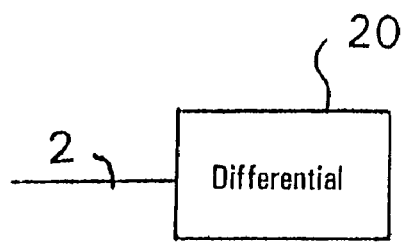
FIG. 6 is a diagrammatic view of an embodiment of the multi-step transmission having a differential.
Figure 15:
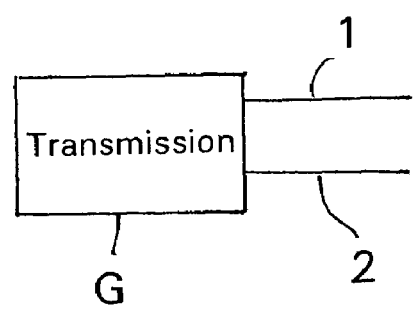
FIG. 15 is a diagrammatic view showing the input and the output on the same side of the transmission housing.

It is possible through the mode of construction of the invention, as shown in FIG. 15, to arrange the input and output on the same side of the transmission or the housing G preferably for transverse, front wheel, longitudinal, rear longitudinal or all-wheel drive arrangements. Moreover, an axle differential 20 and/or an inter-axle differential 20 can be arranged on the input side or on the output side, as shown in FIG. 6.

Figure 7:
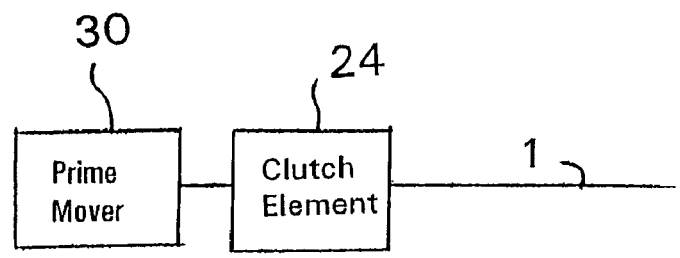
FIG. 7 is a diagrammatic view of the multi-step transmission with a clutch element and a prime mover.
Figure 8:
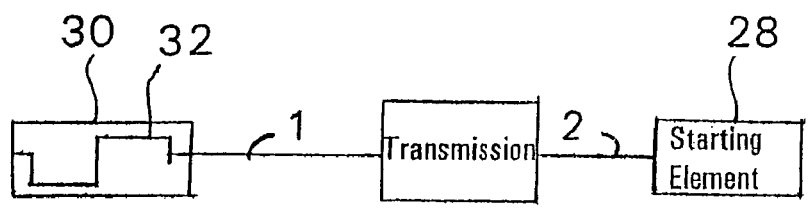
FIG. 8 is a diagrammatic view of the multi-step transmission located between a starting element and a prime mover.
Figure 9:
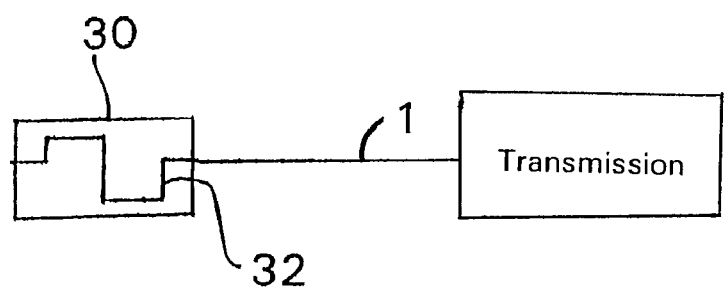
FIG. 9 is a diagrammatic view of the multi-step transmission for a front-transverse installation with a prime mover.

The input shaft I can be separated by a clutch element 24 from a drive motor or a prime mover 30 as needed within the framework of an advantageous further development, as shown in FIG. 7, whereby a hydrodynamic converter, a hydraulic clutch, a dry starting clutch, a wet starting clutch, a magnetic powder clutch or a centrifugal clutch can be used as the clutch element. It is also possible, as shown in FIG. 8, to arrange a starting element 28 of this type behind or downstream of the transmission in the direction of power flow whereby, in this case the input shaft 1 is continuously connected with the crankshaft 32 of the motor or prime mover 30, as shown in FIG. 9. According to the invention, the starting procedure can take place using a shifting element of the transmission. Preferably the brake 04, which is activated in the first forward gear, as well as in the first reverse gear, can be used.

Figure 10:
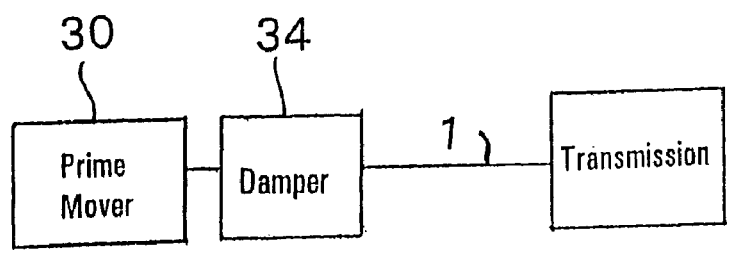
FIG. 10 is a diagrammatic view of the multi-step transmission with a prime mover and a damper.

The multi-step transmission of the invention moreover allows for the arrangement of a torsion vibration damper 34 between the motor or the prime mover 30 and transmission, as shown in FIG. 10.

Figure 11:
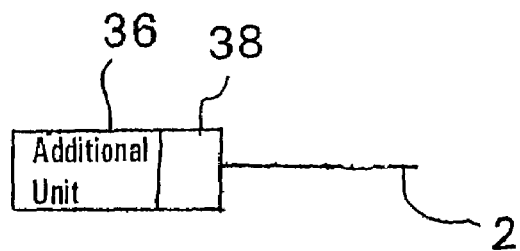
FIG. 11 is a diagrammatic view of the multi-step transmission with an auxiliary output for an additional unit.
Figure 14:
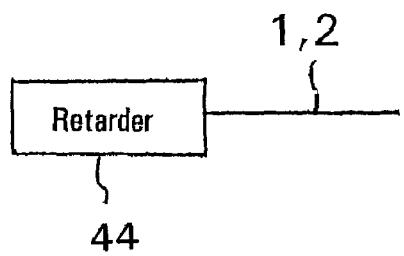
FIG. 14 is a diagrammatic view of one of the shafts having a retarder.

As shown in FIG. 14, a wear-free brake, such as a hydraulic or electric retarder 44 or the like, can be arranged on any shaft, preferably on the input shaft 1 or the output shaft 2, which is especially of significance for use in commercial motor vehicles within the framework of a further, not represented embodiment of the invention. Furthermore, as shown in FIG. 11, an auxiliary output 38 can be provided on any shaft, preferably on the input shaft 1 or the output shaft 2, for driving an additional unit(s) 36 on each shaft.

The shifting elements used can be constructed as power-shifting clutches or brakes. In particular, non-positive clutches or brakes such as multi-plate clutches, band brakes and/or cone couplings can be used. Furthermore, positive locking brakes and/or clutches, such as synchronizations or claw clutches, can be used as shifting elements.

A further advantage of the multi-step transmission presented here, as shown in FIG. 13 consists in an electric machine 40 being installed on each shaft as a generator and/or as an additional drive machine.

The functional features of the claims can be configured in most different ways in terms of their design. These possible design embodiments are not explicitly described for the sake of simplicity. Obviously, each design embodiment of the invention, nonetheless, falls under the scope of protection of the claims, especially any spatial arrangement of the planetary gear sets and the shifting elements in themselves and, in relation to one another, to the extent to which they are technically appropriate.

Reference Numerals
0 shaft
1 shaft
2 shaft
3 shaft
4 shaft
5 shaft
6 shaft
7 shaft
00 brake
03 brake
13 clutch
36 clutch
45 clutch
47 clutch
67 clutch
P1 planetary gear set
P2 planetary gear set
P3 planetary gear set
An input
Ab output
I reduction
φ step progression
G housing

The invention claimed is:

1. A multi-step transmission of a planetary construction for a motor vehicle, comprising:
   an input shaft (1) and an output shaft (2) which are arranged in a housing (G),
   first, second and third planetary gear sets (P1, P2, P3),
   at least third, fourth, fifth, sixth, and seventh shaft (3, 4, 5, 6, 7), as well as at least six shifting elements (00, 03, 13, 36, 45, 47, 67), including brakes and clutches, whose selective engagement brings about different reduction ratios between the input shaft (1) and the output shaft (2) so that seven forward gears and one reverse gear are realized, drive input takes place through the input shaft (1) which is continuously connected with a first element of the first planetary gear set (P1), a further element of the first planetary gear set (P1) is torsion-resistantly fixed with the housing (G) via an eighth fixed shaft (0), drive output takes place through the output shaft (2) which is continuously in connection with a planet carrier of the second planetary gear set (P2) and a ring gear of the third planetary gear set (P3), the third shaft (3) is continuously connected with a planet carrier of the third planetary gear set (P3), the fourth shaft (4) is continuously connected with a ring gear of the second planetary gear set (P2), the fifth shaft (5) is continuously connected with a ring gear of the first planetary gear set (P1), the sixth shaft (6) is continuously connected with a sun wheel of the second planetary gear set (P2), the seventh shaft (7) is continuously connected with a sun wheel of the third planetary gear set (P3), the third shaft (3) can be coupled to the housing (G) through a first brake (03), a first clutch (13) detachably connects the input shaft (1) and the third shaft (3) with one another, a second clutch (36) detachably connects the third shaft (3) and the sixth shaft (6) with one another, a third clutch (45) detachably connects the fourth shaft (4) and the fifth shaft (5) with one another, and fourth and fifth clutches (47, 67) detachably connect the fourth shaft (4) and the sixth shaft (6) with one another, the fourth clutch (47) detachably connects the fourth shaft (4) and the seventh shaft (7) with one another, and the fifth clutch (67) detachably connects the sixth shaft (6) and the seventh shaft (7) with one another.

2. The multi-step transmission according to claim 1, wherein the input shaft (1) is continuously connected with a sun wheel of the first planetary gear set (P1) and a planet carrier of the first planetary gear set (P1) is connected with the housing (G).

3. The multi-step transmission according to claim 1, wherein the input shaft (1) is continuously connected with a planet carrier of the first planetary gear set (P1) and a sun wheel of the first planetary gearset (P1) is connected with the housing (G).

4. The multi-step transmission according to claim 1, wherein the second planetary gear set (P2) and the third planetary gear set (P3) are negative planetary gear sets, and the first planetary gear set (P1) is a positive planetary gear set.

5. The multi-step transmission according to claim 1, wherein the multi-step transmission has a free wheels.

6. The multi-step transmission according to claim 5, wherein the free wheel is provided between at least one of the input, the output, the third, the fourth, the fifth, the sixth and the seventh shafts (1, 2, 3, 4, 5, 6, 7) and the housing (G).

7. The multi-step transmission according to claim 1, wherein the input shaft and the output shafts (1, 2) are provided on a same side of the housing.

8. The multi-step transmission according to claim 1, wherein one of an axle differential and an inter-axle differential is located on an input side or an output side of the multi-step transmission.

9. The multi-step transmission according to claim 1, wherein the input shaft (1) separated from a prime mover by a clutch element.

10. The multi-step transmission according to claim 9, wherein the clutch element is one of a hydrodynamic converter, a hydraulic clutch, a dry starting clutch, a wet starting clutch, a magnetic powder clutch, and a centrifugal clutch.

11. The multi-step transmission according to claim 1, wherein an external starting element is located in a power-flow direction downstream of the multi-step transmission, and the input shaft (1) has a fixed connection with a crankshaft of a prime mover.

12. The multi-step transmission according to claim 1, wherein starting takes place by engagement of one of the at least six shifting elements (00, 03, 13, 36, 45, 47, 67) of the multi-stage transmission and the input shaft (1) is continuously connected with a crankshaft of a prime mover.

13. The multi-step transmission according to claim 12, wherein one of the third clutch (45) and the first brake (03) is used as the shifting element for starting the multi-step transmission.

14. The multi-step transmission according to claim 1, wherein a torsion vibration damper is located between a prime mover and the multi-step transmission.

15. The multi-step transmission according to claim 1, wherein one of the input shaft (1) and the output shaft (2) has a retarder.

16. The multi-step transmission according to claim 1, wherein an auxiliary output is arranged on at least one of the input shaft, the output shaft, the third shaft, the fourth shaft, the fifth shaft. the six shaft and the seventh shaft (1, 2, 3, 4, 5, 6, 7) for driving an additional unit.

17. The multi-step transmission according to claim 16, wherein the auxiliary output is arranged on one of the input shaft (1) and the output shaft (2).

18. The multi-step transmission according to claim 1, wherein the shifting elements are one of power-shifting clutches or brakes.

19. The multi-step transmission according to claim 18, wherein of the shifting elements (00, 03, 13, 36, 45, 47, 67) comprise one of multi-plate clutches, band brakes, and cone couplings.

20. The multi-step transmission according to claim 1, wherein at least one of the shifting elements (00, 03, 13, 36, 45, 47, 67) comprise one of positive-locking brakes and clutches.

21. The multi-step transmission according to claim 1, wherein an electrical machine is attached on at least one of the input shaft, the output shaft, the third shaft, the fourth shaft, the fifth shaft, the six shaft and the seventh shaft (1, 2, 3, 4, 5, 6, 7) as one of a generator and an additional drive machine.

22. A multi-step transmission of a planetary construction for a motor vehicle, comprising:
  an input shaft (1) and an output shaft (2) which are arranged in a housing (G):
  first, second and third planetary gear sets (P1, P2, P3);
  at least third, fourth, fifth, sixth, and seventh shaft (3, 4, 5, 6, 7), as well as at least six shifting elements (00, 03, 13, 36, 45, 47, 67), including brakes and clutches, whose selective engagement brings about different reduction ratios between the input shaft (1) and the output shaft (2) so that seven forward gears and one reverse gear are realized, drive input takes place through the input shaft (1) which is continuously connected with a first element of the first planetary gear set (P1), a further element of the first planetary gear set (P1) is detachably connected, via an eighth shaft (0), with the housing (G) by a second brake (00); drive output takes place through the output shaft (2) which is continuously in connection with a planet carrier of the second planetary gear set (P2) and a ring gear of the third planetary gear set (P3), the third shaft (3) is continuously connected with a planet carrier of the third planetary gear set (P3), the fourth shaft (4) is continuously connected with a ring gear of the second planetary gear set (P2), the fifth shaft (5) is continuously connected with a ring gear of the first planetary gear set (P1), the sixth shaft (6) is continuously connected with a sun gear of the second planetary gear set (P2), the seventh shaft (7) is continuously connected with a sun gear of the third planetary gear set (P3), the third shaft (3) can be coupled to the housing (G) through engagement of a first brake (03) and the second brake (00), a first clutch (13) detachably connects the input shaft (1) and the third shaft (3) with one another, a second clutch (36) detachably connects the third shaft (3) and the sixth shaft (6) with one another, a third clutch (45) detachably connects the fourth shaft (4) and the fifth shaft (5) with one another, and fourth and fifth clutches (47, 67) detachably connect the fourth shaft (4) and the sixth shaft (6) with one another, the fourth clutch (47) detachably connects the fourth shaft (4) and the seventh shaft (7) with one another, and the fifth clutch (67) detachably connects the sixth shaft (6) and the seventh shaft (7) with one another.

23. The multi-step transmission according to claim 22, wherein one of an electric machine and a further input shaft is located on the eighth fixed shaft (0) detachably connected with the housing (G).

* * * * *